United States Patent Office
3,703,526
Patented Nov. 21, 1972

3,703,526
NOVEL 3-(3,5-DICHLOROPHENYL)OXAZOLIDINE-2,4-DIONE DERIVATIVES
Katsumi Sato and Takashi Nakamura, Hiratsuka, Masaru Nakamura, Atsuki, Kazuo Hirasawa, Fuchuu, Matsuo Hamada, Yokohama, Kenzi Takahashi, Hiratsuka, Masaaki Yashima, Atsuki, Toshiaki Ozaki and Sigeo Yamamoto, Toyonaka, Tadashi Ooishi, Minoo, Akira Fujinami, Ashiya, Fukashi Horiuchi, Takatsuki, and Katsuji Nodera, Nishinomiya, Japan, assignors to Sumitomo Chemical Co., Ltd., and Hokko Chemical Industry Co., Ltd.
No Drawing. Continuation-in-part of abandoned application Ser. No. 779,277, Nov. 26, 1968. This application Nov. 16, 1970, Ser. No. 90,160
Int. Cl. C07d 85/34
U.S. Cl. 260—307 B                  4 Claims

ABSTRACT OF THE DISCLOSURE

An oxazolidinedione of the formula:

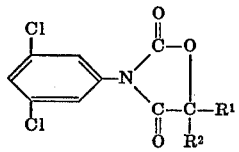

wherein $R^1$ and $R^2$ are each a hydrogen atom or a lower alkyl group, is prepared by reacting 3,5-dichlorophenyl isocyanate with alkyl α-hydroxyalkanoate in the presence of a tertiary organic amine or alternatively reacting 3,5-dichloroaniline, dialkyl carbonate anda lkyl α-hydroxyalkanoate in the presence of an alkali metal alkoxide. The oxazolidinedione is useful as an anti-fungal agent against a variety of phytopathogenic fungi.

This application is a continuation-in-part application of Ser. No. 779,277, filed Nov. 26, 1968 now abandoned.

The present invention relates to novel 3-(3,5-dichlorophenyl)oxazolidine-2,4-dione derivatives, their production and use. It also relates to N-(3,5-dichlorophenyl)carbamate derivatives, their production and use.

In this specification, the term "lower" used in connection with an alkyl group is intended to mean the one having five carbon atoms or less.

The 3 - (3,5 - dichlorophenyl)oxazolidine - 2,4-dione derivatives [hereinafter referred to as "oxazolidinedione"] are representable by the formula:

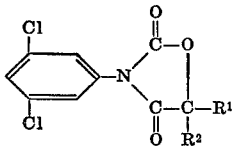

wherein $R^1$ and $R^2$ are each a hydrogen atom or a lower alkyl group (e.g. methyl, ethyl, propyl).

The N - (3,5 - dichlorophenyl)carbamate derivatives [hereinafter referred to as "urethane"] are representable by the formula:

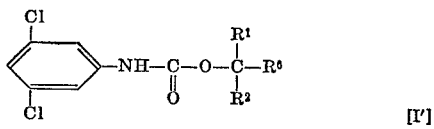

wherein $R^1$ and $R^2$ are each as defined above and $R^6$ is a cyano group or a lower alkoxycarbonyl group (e.g. methoxycarbonyl, ethoxycarbonyl).

Hitherto, a number of compounds closely related to the oxazolidinediones [I] in structure have been known. These compounds exhibit anti-fungal activity, but their activity is so weak as to preclude any practical application. It has now been found that the oxazolidinediones [I] possess unexpectedly high anti-fungal activity against phyto-pathogenic fungi. It has also been found that the anti-fungal activity is exhibited against a wide variety of phytopathogenic fungi. It has further been found that the oxazolidinediones [I] do not cause any phytotioxicity on crop plants when applied in an amount which is sufficient to exert anti-fungal activity. It has further been found that the oxazolidinediones [I] exhibit an extremely low toxicity with regard to mammals and fish.

In addition to the above findings, it has also been found that the urethanes [I'] exhibit high anti-fungal activity against a wide variety of phytopathogenic fungi.

A basic object of the present invention is to embody the novel oxazolidinediones [I]. Another object of this invention is to embody the oxazolidinediones [I] exerting high anti-fungal activity against a wide variety of phytopathogenic fungi. A further object of the invention is to embody an anti-fungal composition for agricultural use comprising as an active ingredient at least one of the oxazolidinediones [I]. A further object of the invention is to embody a process for preparing the oxazolidinediones [I]. A further object of the invention is to embody the urethanes [I'] exerting high anti-fungal activity against a wide variety of phyto-pathogenic fungi. A still further object of the invention is to embody a process for preparing the urethanes [I']. These and other objects will be apparent to those conversant with the art to which the present invention pertains from the subsequent descriptions.

The oxazolidinedione [I] can be prepared by a variety of procedures, some of which are shown in the following scheme:

Procedure 1

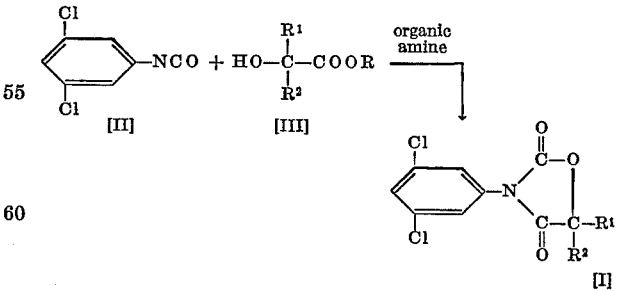

Procedure 2

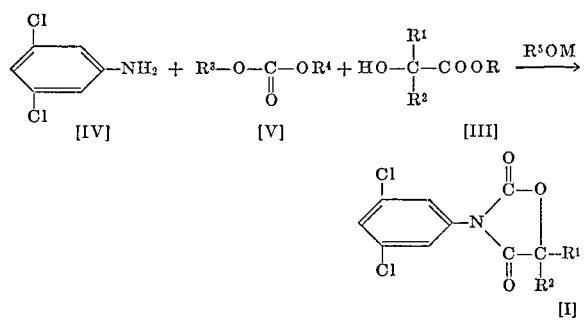

Procedure 3

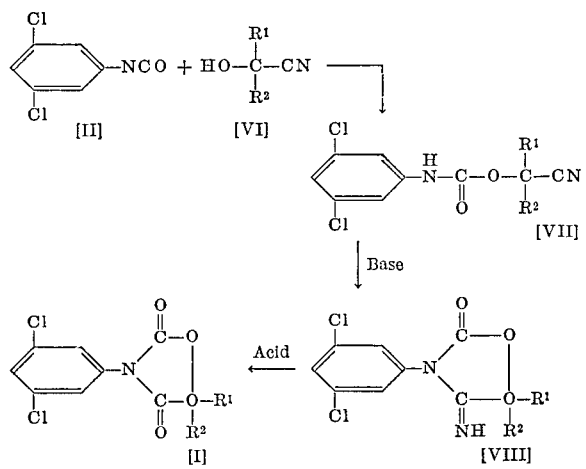

Procedure 4

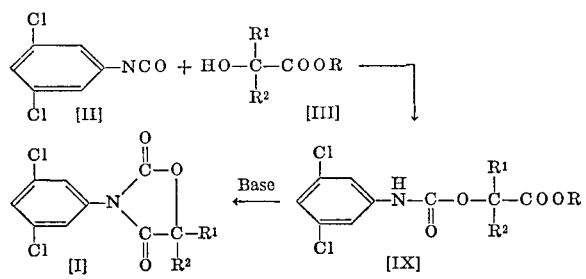

Procedure 5

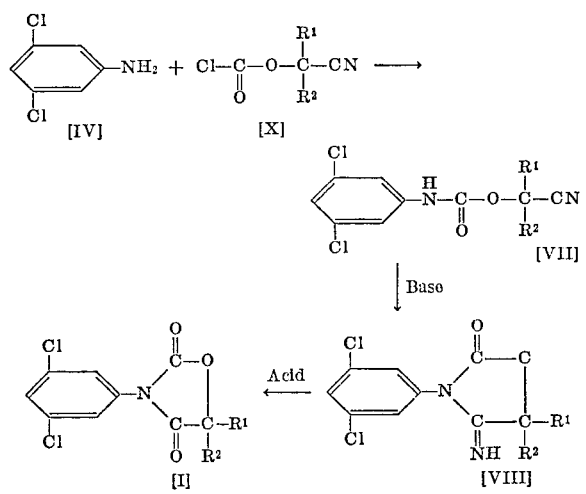

Procedure 6

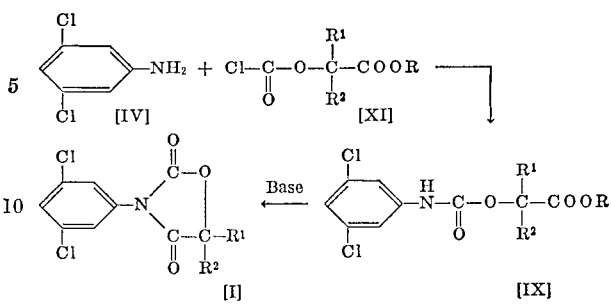

wherein R, $R^3$, $R^4$ and $R^5$ are each a lower alkyl group (e.g. methyl, ethyl, propyl), M is an alkali metal atom (e.g. sodium, potassium) and $R^1$ and $R^2$ are each as defined above. In the scheme, the urethane compounds [VII] and [IX] are species which fall in the category of the urethane [I'].

For production of the oxazolidinedione [I], the procedures 1 and 2 are more favorable than the procedures 3 to 6. The adoption of any latter one is, however, essential for preparation of the urethane [I'].

In procedure 1, the reaction is carried out by treating 3,5-dichlorophenyl isocyanate with alkyl α-hydroxyalkanoate in the presence of a tertiary organic amine (e.g. trimethylamine, triethylamine, tripropylamine, N-methylpiperidine, pyridine, picoline, lutidine). The reaction may be carried out, if necessary, in an organic solvent (e.g. benzene, toluene). The reaction is normally carried out at a temperature between room temperature and refluxing temperature within a period of about 8 hours.

One of the starting materials, 3,5-dichlorophenyl isocyanate, can be prepared by reacting 3,5-dichloroaniline with phosgene. The other starting material, alkyl α-hydroxyalkanoate such as methyl glycolate, ethyl glycolate, propyl glycolate, isopropyl glycolate, methyl lactate, ethyl lactate, propyl lactate, isopropyl lactate, methyl α-hydroxybutyrate, ethyl α-hydroxybutyrate, propyl α-hydroxybutyrate, isopropyl α-hydroxybutyrate, methyl α-hydroxyisobutrate, ethyl α-hydroxyisobutyrate, propyl α-hydroxyisobutyrate or isopropyl α-hydroxyisobutyrate, may be prepared by reacting α-hydroxyalkanenitrile with alkanol in the presence of hydrogen chloride, followed by hydrolysis of the resulting imide ether [cf. Chemical Abstracts, vol. 50, 9291 (1956)].

In procedure 2, the reaction is effected by treating 3,5-dichloroaniline, dialkyl carbonate and alkyl α-hydroxyalkanoate in the presence of alkali alkoxide (e.g. sodium methoxide, sodium ethoxide, potassium ethoxide). Excess of dialkyl carbonate serves as the reaction medium. The amount of the akali alkoxide may vary usually from 0.1 to 2% by weight based on 3,5-dichloroaniline. The reaction is ordinarily carried out while heating around the refluxing temperature for 1 to 5 hours, during which time the by-product alcohol may be distilled off.

Illustrating the preparation of the urethane compound [VII] according to the procedure 3 in detail, 3,5-dichlorophenyl isocyanate [II] is reacted with α-hydroxyalkanenitrile [IV] in an inert solvent such as benzene, toluene, xylene, isopropyl ether, dichloroethane, chloroform or carbon tetrachloride, if necessary, in the presence of a catalytic amount of a base such as pyridine, piperidine, N-methylmorpholine, dimethylaniline, diethylaniline or triethylamine, usually at a temperature from 10 to 50° C. The thus produced urethane compound, i.e. α-cyanoalkyl N-(3,5-dichlorophenyl)carbamate [VII], is isolated from the reaction mixture according to an ordinary method.

The urethane compound [IX] can be obtained according to the procedure 4 by a method similar to that of the procedure 3 except that alkyl α-hydroxyalkanoate [III] is used instead of α-hydroxyalkanenitrile [IV].

Illustrating the preparation of the urethane compound [VII] according to the procedure 5 in detail, 3,5-dichloroaniline [IV] is reacted with α-chlorocarbonyloxyalkanenitrile [X] in the presence of a slightly excess amount of an acid-eliminating agent such as pyridine, dimethylaniline, diethylaniline, triethylamine or N-methylmorpholine in an inert solvent such as benzene, toluene, xylene, monochlorobenzene, dichloroethane, tetrachloroethylene or chloroform at 10 to 30° C. The thus prepared urethane compound, i.e. α-cyanoalkyl N-(3,5-dichlorophenyl)carbamate [VII], is isolated from the reaction mixture according to an ordinary method.

The urethane compound [IX] can be obtained according to the procedure 6 by a method similar to that of the procedure 5 except that alkyl α-chlorocarbonyloxyalkanoate [XI] is used instead of α-chlorocarbonyloxyalkanenitrile [X].

The above prepared urethane compound [VII] or [IX] can be readily converted into the oxazolidinedione [I] by treatment with a base, if necessary, followed by treatment with an acid.

Some practical examples of the above procedures for the preparation of the oxazolidinediones [I] are shown below.

EXAMPLE 1

To a solution of 3,5-dichlorophenyl isocyanate (18.8 g.) in benzene (300 ml.), ethyl glycolate (10.4 g.) is added at room temperature. The resultant mixture is cooled to 0° C., and a mixture of triethylamine (0.15 g.) and benzene (10 g.) is added dropwise thereto. The resulting mixture is stirred at a temperature from 0° C. to room temperature for 2 hours and then heated while refluxing for 4 hours. After cooling, the reaction mixture is washed with 2% hydrochloric acid and water in that order, dried over anhydrous sodium sulfate and concentrated. The residue is washed with petroleum ether to give 3-(3,5-dichlorophenyl)oxazolidine-2,4-dione (22.6 g.) as white solid. M.P. 158 to 159° C.

EXAMPLE 2

A solution of pyridine (0.15 g.) in benzene (10 ml.) at room temperature is added to a mixture of 3,5-dichlorophenyl isocyanate (18.8 g.), isopropyl lactate (13.1 g.) and benzene (300 ml.). The resultant mixture is treated as described in Example 1 to give 3-(3,5-dichlorophenyl)-5-methyloxazolidine-2,4-dione (23.4 g.). M.P. 123 to 124.5° C.

EXAMPLE 3

A solution of 3,5-dichlorophenyl isocyanate (18.8 g.) in benzene (300 ml.) at a temperature from 0 to 10° C. is added dropwise to a mixture of methyl α-hydroxyisobutyrate (11.8 g.), N-methylpiperidine (0.15 g.) and benzene (10 ml.). The resultant mixture is heated while refluxing for 8 hours. The reaction mixture is treated as described in Example 1 to give 3-(3,5-dichlorophenyl)-5,5-dimethyloxazolidine-2,4-dione (25.8 g.). M.P. 167 to 168° C.

EXAMPLE 4

A solution of propyl α-hydroxybutyrate (14.6 g.) and tripopylamine (0.2 g.) in toluene (10 ml.) is added dropwise to a solution of 3,5-dichlorophenyl isocyanate (18.8 g.) in toluene (300 ml.) maintained at 0 to 10° C. The resultant mixture is heated at 80 to 90° C. for 6 hours while stirring. The reaction mixture is treated as described in Example 1 to give 3-(3,5-dichlorophenyl)-5-ethyloxazolidine-2,4-dione (24.9 g.). M.P. 141 to 141.5° C.

EXAMPLE 5

A mixture of 3,5-dichloroaniline (16.2 g.), ethyl glycolate (10.4 g.), diethyl carbonate (35.4 g.) and sodium ethoxide (0.1 g.) is heated while refluxing for 3 hours. The reaction mixture is cooled to room temperature, admixed with 2% hydrochloric acid and water (30 ml.) and stirred well. After removal of the hydrochloric acid layer, the resulting solution is washed with water, dried over anhydrous sodium sulfate and concentrated to give 3-(3,5-dichlorophenyl)oxazolidine-2,4-dione (20.9 g.). M.P. 158 to 159° C.

EXAMPLE 6

A mixture of 3,5-dichloroaniline (16.2 g.), ethyl lactate (11.8 g.), diethyl carbonate (59 g.) and sodium ethoxide (0.1 g.) is heated while refluxing for 1.5 hours. Ethanol by-product is distilled off along with diethyl carbonate and diethyl carbonate is further supplied to the reaction system. The reaction mixture is cooled and treated as in Example 5 to give 3-(3,5-dichlorophenyl)-5-methyloxazolidine-2,4-dione (24.2 g.). M.P. 123 to 124.5° C.

EXAMPLE 7

A mixture of 3,5-dichloroaniline (16.2 g.), methyl α-hydroxyisobutyrate (11.7 g.), ethyl methyl carbonate (51.5 g.), ethanol (3 g.) and metallic potassium (0.1 g.) is heated while refluxing for 2 hours, during which time excess of ethanol and by-product ethanol and methanol are distilled off with ethyl methyl carbonate. Ethyl methyl carbonate is further supplied to the reaction system. The reaction mixture is cooled and treated as described in Example 5 to give 3-(3,5-dichlorophenyl)-5,5-dimethyloxazolidine-2,4-dione (26.8 g.). M.P. 167 to 168° C.

EXAMPLE 8

A 10 liter-volume flask is equipped with a stirrer, a thermometer and a fractional distillation tube, said tube being provided with a thermometer and a cooling collector at the terminal end. In the flask, 3,5-dichloroaniline (1620 g.), methyl α-hydroxybutyrate (1180 g.), dimethylcarbonate (4500 g.), methanol (30 g.) and metallic sodium (1 g.) are introduced. The mixture is gradually heated up to the boiling point of dimethyl carbonate. The inner temperature is then adjusted so as to distill off methanol alone. The heating with reflux is continued for a 5 hour period. After cooling, the reaction mixture is washed with 2% hydrochloric acid (500 ml.) and water (1000 ml.), in that order and concentrated under reduced pressure to give 3-(3,5-dichlorophenyl)-5-ethyloxazolidine-2,4-dione (2660 g.).

EXAMPLE 9

3,5-dichlorophenyl isocyanate (18.8 g.), glycolonitrile (5.7 g.) and pyridine (0.1 g.) are dissolved in toluene (50 g.), and the resultant mixture is maintained at 20 to 40° C. for 3 hours. Then, the precipitated crystals are collected by filtration to give cyanomethyl N-(3,5-dichlorophenyl)carbamate (22.3 g.). M.P. 138.0 to 140.5° C.

The above prepared cyanomethyl N-(3,5-dichlorophenyl)carbamate is combined with a solution of diethylaniline in toluene at room temperature, and the resultant mixture is heated while refluxing for 2 hours. The resulting product is treated with 20% hydrochloric acid in toluene at 80° C. to give 3-(3,5-dichlorophenyl)oxazolidine-2,4-dione. M.P. 158 to 159° C.

EXAMPLE 10

In a 300 ml. volume flask, there are charged toluene (150 g.), phosgene (29.7 g.) and acetonecyanohydrin (21.3 g.). To the resulting mixture while maintaining at 12 to 15° C. under stirring, pyridine (21.3 g.) is dropwise added in 1 hour. After the dropwise addition is completed, the resulting mixture is stirred at 20° C. for 1 hour. The reaction mixture is washed with cold water (75 g.), 5% hydrochloric acid (75 g.) and cold water (75 g.) in order, and the toluene layer is separated and dried over anhydrous sodium sulfate (30 g.). The thus obtained toluene solution of α-cyanoisopropyl chloroformate (α-chlorocarbonyloxyisobutyronitrile) is charged in a 300 ml. volume flask, and a mixture of 3,5-dichloroaniline (36.5 g.) and N,N-diethylaniline (40.2 g.) is dropwise added at 10 to 20° C. in 30 minutes. Then, the resultant mixture is stirred at 20° C. for 1 hour. The reaction mixture is washed with cold water (75 g.), 5% hydrochloric acid (75 g.) and cold water (75 g.) in order, and the toluene is evaporated to give α-cyanoisopropyl N-(3,5- dichlorophenyl)carbamate (60.3 g.). M.P. 144.5 to 146.5° C.

The above prepared α-cyanoisopropyl N-(3,5-dichlorophenyl)carbamate is combined with a solution of diethylaniline in toluene at room temperature, and the resultant mixture is heated while refluxing for 2 hours. The resulting product is treated with 20% hydrochloric acid in toluene at 80° C. to give 3-(3,5-dichlorophenyl)-5,5-dimethyloxazolidine-2,4-dione.

As stated above, the oxazolidinediones [I] which are thus obtained exhibit strong anti-fungal activity against a wide varity of phyto-pathogenic fungi such as *Sclerotinia sclerotiorum, Rhizoctonia solani, Botrytis cinera, Piricularia oryzae, Cochliobolus miyabeanus* and *Pellicularia sasaki*. Some of the test results from which such activity is confirmed are shown below.

TEST 1

A test compound, in dust form, was applied to rice plants grown up to three leaf stage in pots having a diameter of 9 cm. at a dose of 100 mg. of the test compound per pot. The application was made by the use of a duster. After one day, a spore suspension of *Piricularin oryzae* was sprayed on the plants for inoculation. The number of infectious spots was calculated 5 days thereafter. The results are shown in Table 1.

TABLE 1

| Test compound | Concentration (percent) | Number of infectious spots per leaf | Phytotoxicity |
|---|---|---|---|
| 3-(3,5-dichlorophenyl)-5-methyloxazolidine-2,4-dione | 3.0 | 0.6 | None. |
| 3-(3,5-dichlorophenyl)-5,5-dimethyloxazolidine-2,4-dione | 3.0 | 0.9 | Do. |
| Phenylmercuric acetate | 0.29 | 1.0 | Do. |
| None (untreated) | | 18.7 | Do. |

TEST 2

A test compound in wettable powder form was diluted with water and applied to rice plants grown up to four leaf stage in pots having a diameter of 9 cm. at a dose of 7 ml. of the dilution per pot. After one day, a spore suspension of *Cochliobolus miyabeanus* was sprayed on the plant for inoculation. The number of infectious spots was calculated 4 days thereafter. The results are shown in Table 2.

TABLE 2

| Test compound | Concentration (p.p.m.) | Number of infectious spots per leaf |
|---|---|---|
| 3-(3,5-dichlorophenyl)-5-methyloxazolidine-2,4-dione | 500 | 0.5 |
| 3-(3,5-dichlorophenyl)-5,5-dimethyloxazolidine-2,4-dione | 500 | 0.7 |
| 3-(3-chlorophenyl)-4-imino-5,5-dimethyloxazolidin-2-one | 500 | 48.2 |
| 3-(4-chlorophenyl)-5-ethyloxazolidine-2,4-dione | 500 | 45.3 |
| Phenylmercuric acetate | 15 | 3.6 |
| None (untreated) | | 61.4 |

TEST 3

A test compound in wettable powder form was diluted with water and applied to kidney bean seedlings grown up to two leaf stage in pots having a diameter of 15 cm. at a dose of 7 ml. of the dilution per pot. After one day, potato juice agar pieces (about 6 mm. in diameter) of *Sclerotinia sclerotiorum* as inoculum were attached on the leaves. The state of infection was observed 4 days thereafter. The results are shown in Table 3 wherein the degree of infection is calculated by the following equation:

Degree of infection $$= \frac{0 \times n_0 + 1 \times n_1 + 2 \times n_2 + 3 \times n_3 + 4 \times n_4 + 5 \times n_5}{n_0 + n_1 + n_2 + n_3 + n_4 + n_5}$$

in which $n_0$, $n_1$, $n_2$, $n_3$, $n_4$ and $n_5$ are each the number of the leaves having the corresponding infectious index determined as follows:

| Infectious index: | Infectious area |
|---|---|
| 0 | None. |
| 1 | Less than 1/5 of the total area of the leaf. |
| 2 | More than 1/5 and less than 2/5 of the total area of the leaf. |
| 3 | More than 2/5 and less than 3/5 of the total area of the leaf. |
| 4 | More than 3/5 and less than 4/5 of the total area of the leaf. |
| 5 | More than 4/5 of the total area of the leaf. |

TABLE 3

| Test compound | Concentration (p.p.m.) | Degree of infection |
|---|---|---|
| 3-(3,5-dichlorophenyl)-5-methyloxazolidine-2,4-dione | 50 | 0.5 |
| 3-(3,5-dichlorophenyl)-5,5-dimethyloxazolidine-2,4-dione | 50 | 0 |
| 3-(3,5-dichlorophenyl)-5-ethyloxazolidine-2,4-dione | 50 | 0 |
| 3-(3-chlorophenyl)-4-imino-5,5-dimethyloxazolidin-2-one | 250 | 3.1 |
| | 50 | 5.0 |
| 3-(3-chlorophenyl)-5,5-dimethyloxazolidine-2,4-dione | 250 | 2.2 |
| | 50 | 5.0 |
| 3-phenyl-5,5-dimethyloxazolidine-2,4-dione | 250 | 4.8 |
| | 50 | 5.0 |
| 2,6-dichloro-4-nitroaniline | 250 | 2.0 |
| | 50 | 5.0 |
| None (untreated) | | 5.0 |

TEST 4

Kidney bean seedlings grown up to one leaf stage were transplanted into pots of 28 cm. in diameter. After 7 days, 3-(3,5-dichlorophenyl) - 5,5 - dimethyloxazolidine-2,4-dione in 3% granule form was spread on the soil in the pots. As inoculum, potato juice agar pieces of *Sclerotinia sclerotiorum* were attached on the leaves on the 7th, 14th and 24th days after spreading the compound. The state of infection was observed 4 days thereafter. The results are shown in Table 4.

TABLE 4

| Test compound | Concentration (g./10 ares) | Days from spreading the compound to attaching fungus— | | |
|---|---|---|---|---|
| | | 7 | 14 | 24 |
| | | Number of infectious spots per leaf | | |
| 3-(3,5-dichlorophenyl)-5,5-dimethyloxazolidine-2,4-dione | 45 | 2.0 | 1.2 | 1.0 |
| | 90 | 1.7 | 1.0 | 0.9 |
| | 180 | 1.4 | 0.8 | 0.6 |
| None (untreated) | | 4.9 | 5.0 | 5.0 |

TEST 5

Kidney bean seedlings grown up to one leaf stage which were transplanted into pots of 9 cm. in diameter were exposed to fumes of 3-(3,5-dichlorophenyl)-5,5-dimethyloxazolidine-2,4-dione said fumes being produced on a heating fumigator. Exposure was for 15 hours in a space enclosed by vinyl sheets. After removing the vinyl sheets, potato juice agar pieces of *Sclerotinia sclerotiorum* as inoculum were attached on either the upper or lower surfaces of the leaves. The state of infection was observed 4 days thereafter. The results are shown in Table 5.

Rhizoctonia rot and Botrytis gray mold of vegetables and field crops, and blast, brown leaf spot and sheath blight of rice plants. In other words, they are useful as active ingredients in fungicidal compositions for agricultural use.

According to the present invention, fungicidal compositions, such as dusts, wettable powders, emulsifiable concentrates, fumigants and granules, are contemplated which comprise at least one of the oxazolidinediones [I] in association with one or more gas, solid or liquid carriers of the types commonly used in fungicidal compositions. Besides the oxazolidinediones [I], these fungi-

TABLE 5

| Test compound | Concentration (mg./m.³) | Number of infectious spots per leaf | |
|---|---|---|---|
| | | Upper surface inoculated leaves | Lower surface inoculated leaves |
| 3-(3,5-dichlorophenyl)-5,5-dimethyloxazolidine-2,4-dione | 500 | 0 | 0 |
| | 100 | 0 | 0.4 |
| | 25 | 0 | 1.1 |
| None (untreated) | | 5.0 | 5.0 |

As shown above, the anti-fungal activity of the oxazolidinediones [I] against various phyto-pathogenic fungi is much higher than that of structurally related chemical compounds. Such notable inherency to the oxazolidinediones [I] having a 3,5-dichlorophenyl substituent will be more fully understood from the test results as shown in Table 6.

TABLE 6

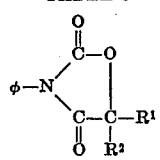

| φ | R¹ | R² | Fungicidal activity (μM) | | | | |
|---|---|---|---|---|---|---|---|
| | | | 400 | 80 | 16 | 3.2 | 1.6 |
| Phenyl | CH₃ | CH₃ | + | − | − | − | |
| 2-chlorophenyl | CH₃ | CH₃ | + | − | − | − | |
| 3-chlorophenyl | CH₃ | CH₃ | + | − | − | − | |
| 4-chlorophenyl | CH₃ | CH₃ | − | − | − | − | |
| 2,3-dichlorophenyl | CH₃ | CH₃ | − | − | − | − | |
| 2,4-dichlorophenyl | CH₃ | CH₃ | − | − | − | − | |
| 2,5-dichlorophenyl | CH₃ | CH₃ | − | − | − | − | |
| 2,6-dichlorophenyl | CH₃ | CH₃ | − | − | − | − | |
| 3,4-dichlorophenyl | CH₃ | CH₃ | − | − | − | − | |
| 3,5-dichlorophenyl* | CH₃ | CH₃ | + | + | + | + | ± |
| 3,5-dimethylphenyl | CH₃ | CH₃ | − | − | − | − | |
| 3,5-dinitrophenyl | CH₃ | CH₃ | − | − | − | − | |
| 2,4,5-trichlorophenyl | CH₃ | CH₃ | − | − | − | − | |
| 3,5-dichlorophenyl* | H | H | + | + | ± | − | |
| Do. | CH₃ | H | + | + | + | − | |
| Do. | C₆H₅ | H | − | − | − | − | |
| 3-chlorophenyl | H | H | − | − | − | − | |
| Do. | CH₃ | H | ± | − | − | − | |
| Do. | C₆H₅ | H | − | − | − | − | |
| 3,4-dichlorophenyl | H | H | − | − | − | − | |
| Do. | CH₃ | H | − | − | − | − | |
| Do. | C₆H₅ | H | − | − | − | − | |

NOTE.—The mark (*) represents the compound of the invention. The fungicidal activity was determined by the agar dilution method using *Sclerotinia sclerotiorum*. The marks "+", "±" and "−" indicate respectively more than 95%, 50 to 95% and less than 50% in the growth inhibition rate.

Similarly, the urethanes [I'] which are intermediates to the production of the oxazolidinediones [I] also exhibit high anti-fungal activity against a wide variety of phytopathogenic fungi as mentioned above.

Accordingly, the oxazolidinediones [I] are useful for the control of such plant diseases as Sclerotinia rot, cidal compositions may contain one or more known fungicides and insecticides (e.g.

Blasticidin S,
Kasugamycin,
O,O-diethyl-S-benzyl-phosphorothiolate,
O-ethyl-S,S-diphenyl-phosphorodithiolate,
O-n-butyl-S-ethyl-S-benzylphosphorodithiolate,
O,O-diisopropyl-S-benzylphosphorothiolate,
O-ethyl-S-benzylphenylthiophosphonate,
pentachlorobenzaldoxime,
pentachlorobenzyl alcohol,
pentachloromandelonitrile,
pentachlorophenyl acetate,
iron methylarsonate,
Zineb (zinc ethylene bis (dithiocarbamate)),
Maneb (manganese ethylene bis(dithiocarbamate)),
BHC (benzene hexachloride),
Malathion (O,O-dimethyl S-(N-1,2-dicarboethoxy) ethyl phosphorodithioate),
Dimethoate (O,O-dimethyl S-(N-methyl carbamoyl) methyl phosphorodithioate),
EPN (O-ethyl O-p-nitrophenyl benzene phosphorothioate),
1-naphthyl N-methylcarbamate,
3,4-dimethylphenyl-N-methylcarbamate,
Sumithion (O,O-dimethylo-(4-nitro-m-tolyl) phosphorothioate),
tetrachloroisophthalonitrile,
poly-zinc dimethyldithiocarbamoylpolyethylene-bis-thiocarbamoyl disulfide, etc.). These germicidal compositions may also contain one or more materials known to be active as insecticides, nematocides, acaricides, herbicides, fertilizers, soil conditioners or plant growth regulators. Examples of typical fungicidal compositions according to this invention are:

(a) Dusts obtained by dispersing at least one of the oxazolidinediones [I] as the active ingredient in a concentration of 0.1 to 30% by weight in an inert carrier (e.g. talc, diatomaceous earth, wood flour, clay).

(b) Wettable powders obtained by dispersing at least one of the oxazolidinediones [I] as the active ingredient in a concentration of 0.2 to 80% by weight in an inert adsorbent carrier (e.g. diatomaceous earth) together with a wetting and/or dispersing agent such as an alkali metal salt of a long aliphatic sulfate chain, a partly neutralized sulfuric acid derivative of either a petroleum oil or a natural occurring glycerine or a condensation product of an alkylene oxide with an organic acid.

(c) Emulsifiable concentrates obtained by dispersing at least one of the oxazolidinediones [I] as the active ingredient in a concentration of 1 to 50% by weight in weight in an organic solvent (e.g. dimethylsulfoxide) plus a wetting and/or dispersing agent such as an alkali metal salt of a long aliphatic sulfate chain, a partly neutralized sulfuric acid derivative of either a petroleum oil or a natural occurring glycerine or a condensation product of an alkylene oxide with an organic acid.

(d) Compositions of the oxazolidinediones [I] formulated in the manner commonly employed in the art for the preparation of fungicidal dusts and aerosols.

More specific examples of the fungicidal compositions of this invention are shown below.

EXAMPLE A

3 - (3,5 - dichlorophenyl) - 5 - methyloxazolidine-2,4-dione (50 parts by weight), an alkylbenzenesulfonate (5 parts by weight) as a wetting agent and diatomaceous earth (45 parts by weight) are crushed and mixed well to form a wettable powder preparation containing 50% by weight of the active ingredient. The wettable powder preparation is diluted with water and then applied.

EXAMPLE B 3-(3,5-dichlorophenyl) - 5,5 - dimethyloxazolidine-2,4-dione (3 parts by weight) and clay (97 parts by weight) are crushed and mixed well to form a dust preparation containing 3% by weight of the active ingredient. The dust preparation is applicable as such.

EXAMPLE C

3 - (3,5 - dichlorophenyl) - 5 - methyloxazolidine-2,4-dione (3 parts by weight), pulverized bentonite (15 parts by weight), carboxymethylcellulose (1 part by weight) and pulverized clay (81 parts by weight) are mixed well in a mixer and water (20 parts by weight) is added thereto to make up a uniform paste. The resultant mixture is granulated and dried to form a granule preparation containing 3% by weight of the active ingredient. The granule preparation is applicable as such.

What is claimed is:

1. An oxazolidinedione of the formula:

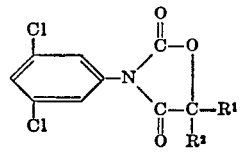

wherein $R^1$ and $R^2$ are each a hydrogen atom or a lower alkyl group.

2. The oxazolidinedione according to claim 1 wherein $R^1$ is a hydrogen atom and $R^2$ is a methyl group.

3. The oxazolidinedione according to claim 1 wherein $R^1$ is a hydrogen atom and $R^2$ is an ethyl group.

4. The oxazolidinedione according to claim 1 wherein $R^1$ and $R^2$ are each a methyl group.

References Cited

UNITED STATES PATENTS

| | | | |
|---|---|---|---|
| 2,928,840 | 3/1960 | Shapiro et al. | 260—307 |
| 3,201,410 | 8/1965 | Morel et al. | 260—307 |
| 3,311,655 | 3/1967 | Boileau et al. | 260—471 |

ALEX MAZEL, Primary Examiner

R. V. RUSH, Assistant Examiner

U.S. Cl. X.R.

260—465 D, 471 C; 424—272

PO-1050
(5/69)

UNITED STATES PATENT OFFICE
CERTIFICATE OF CORRECTION

Patent No. 3703526            Dated November 21, 1972

Inventor(s) Katsumi Sato, et al.

It is certified that error appears in the above-identified patent and that said Letters Patent are hereby corrected as shown below:

Claims Priority of Japanese Applications
No. 77240 of December 1, 1967
No. 6727 of February 5, 1968 and
No. 7744 of February 9, 1968

Signed and sealed this 1st day of May 1973.

(SEAL)
Attest:

EDWARD M. FLETCHER, JR.      ROBERT GOTTSCHALK
Attesting Officer               Commissioner of Patents